(No Model.)
A. E. STEPHENSON.
ELECTRIC BATTERY.
No. 573,493. Patented Dec. 22, 1896.
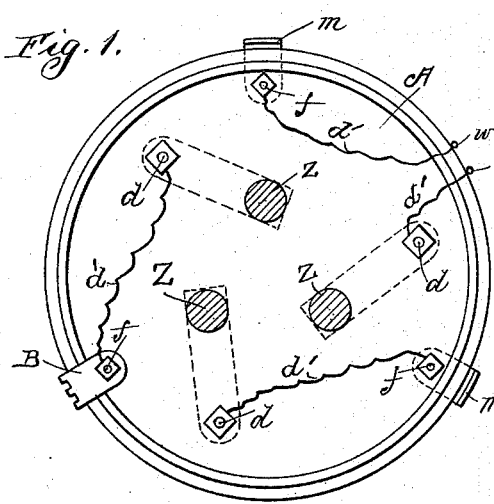
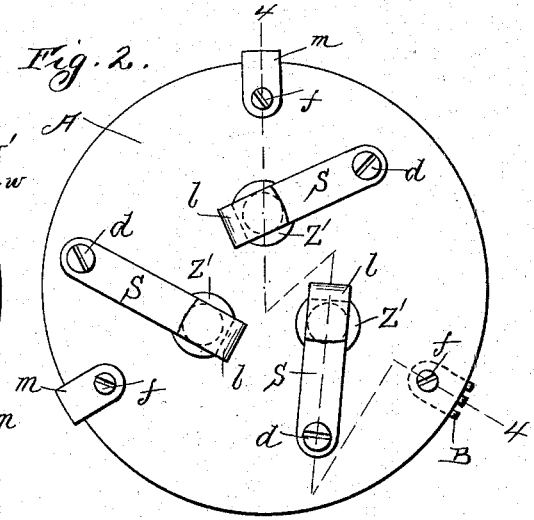
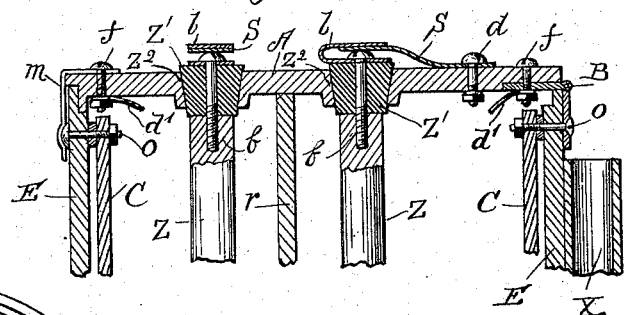
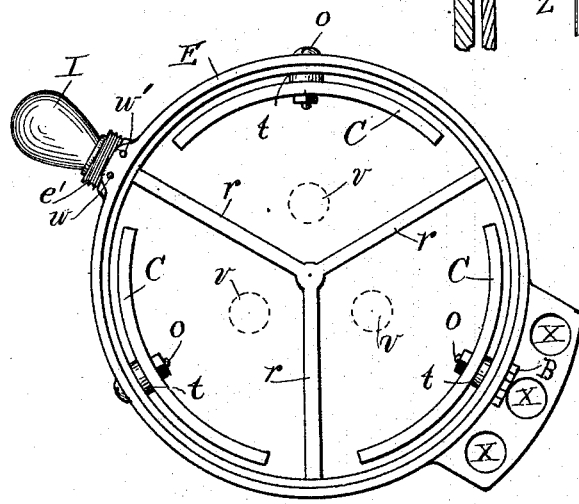
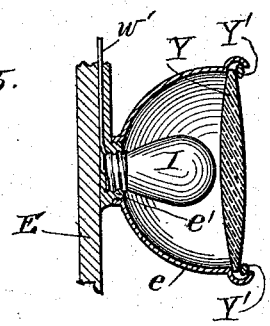
Witnesses:
K. J. Jacker.
Henry Henvig
Inventor:
Albert E. Stephenson
By O. A. Bishop
Atty

UNITED STATES PATENT OFFICE.

ALBERT E. STEPHENSON, OF CHICAGO, ILLINOIS.

ELECTRIC BATTERY.

SPECIFICATION forming part of Letters Patent No. 573,493, dated December 22, 1896.

Application filed June 29, 1896. Serial No. 597,353. (No model.)

*To all whom it may concern:*

Be it known that I, ALBERT E. STEPHENSON, a citizen of the United States, residing at Chicago, county of Cook, State of Illinois, have invented a new and useful Improvement in Electric Batteries, of which the following is a specification.

My invention relates to improvements in electric devices wherein fluid solutions are used in connection with zinc and carbon electrodes to generate a current of sufficient force to produce an incandescent light of two or more candle-power; and the objects of my improvements are, first, to provide a cheap portable lamp to be used on vehicles of all kinds; second, by an arrangement of switches, simple connections, and removable zincs to prevent the waste of zinc and solution when the light is not wanted. I attain these objects by a mechanism illustrated in the accompanying drawings, in which—

Figure 1 is a view of the under side of the cover, showing the method of connecting the zincs and carbons by lead wires through hinge and spring-latches. Fig. 2 is top view of a cover to the battery, showing the arrangement of switches and zinc connections. Fig. 3 is a top view of the battery, showing three (3) triangular cells, also the incandescent lamp on the front side of the battery, and the three (3) pockets on the back side under the hinge. Fig. 4 is a vertical sectional view on lines 4 4, Fig. 2, in detail of the battery with the lower half cut away, showing the method of suspending the zinc in the cells and how the connections are made with the switches and the way the carbons are fixed to the wall of the battery. Fig. 5 is a vertical section of a portion of the front wall of the battery, showing the method of fixing the incandescent lamp and reflector to the battery.

Similar letters refer to similar parts throughout the several views.

The battery E in Fig. 3 is made of any suitable material, cylindrical in shape, divided into three (3) cells by partitions $r$, placed radially from the center to the walls of the battery. To the circular walls of these cells carbons C C C, bent to conform to the circle, are fixed by screws $o$, insulated by a washer $t$, placed between the wall and the carbons, the heads of two screws $o$ being used as connecting-points. The hinge B is also used as a connecting-point. Half-way down the front side of the battery a boss $e'$ is raised on its surface, provided with an aperture having a screw-thread inside to receive the lamp I. It also has a thread on its outside to connect the reflector $e$. (Shown at Fig. 5.) The reflector is provided with a lens Y, held in place by an open wire ring Y', sprung into the groove between the lens and the reflector. The wall of the battery is made thicker from the globe to the top to provide for two connecting-wires $w\ w'$, cast in the substance of which the battery-case is composed. On the back side of the battery are fixed three (3) pockets X X X, extending down the whole length, (shown at X, Fig. 4.) The object of these pockets is to hold the zincs, when the light is not in use, to prevent waste. The dotted circles $v$ in Fig. 3 show the places occupied by the zincs in the cells.

Fig. 1 shows the under side of the cover A, with the leading-wires $d'$, connected with the two spring-latches $m\ m$ and hinge B, secured by the screws $f$, which also hold the springs and hinge in place fixed to the cover. The wires lead from thence to the screws $d$, where they are fixed. The switches S, Fig. 2, are pivoted on the top of the cover to the same screws $d$, the switches being flat strips of metal bent up from the plane of the cover. (See Fig. 4.) Circular openings slightly tapering from the top are provided in the cover $Z^2$, Fig. 4. The zincs Z are provided with rubber plugs Z'. These plugs are fixed to the zincs by screws $b$, the same screw holding a strip of metal bent in the shape of U with its free end resting slightly against the head of screw $b$, making a close contact with the switch when it is placed between them. The switches also serve to hold the plugs and zincs in their places.

The cover is fixed to the battery-case by the hinge, and when closed the latches $m\ m$ spring over the heads of the screws $o$, thus making the electric connections between the carbons and zincs. The wires $d'$ lead out to the connecting-point $w\ w'$ in Fig. 3 and thence to the incandescent lamp.

The cells having been filled with the electrolyte, electric action will take place and the lamp become luminous. The light is extinguished by moving either of the switches from contact with the zinc.

When the light is not required, the switches are moved away from the zinc connections and the zincs taken out of the liquid and placed in the pockets in the rear.

I am aware that all of the various devices used by me in this battery are old. Hence I do not claim any one of them as new; but What I do claim as my invention, and wish to secure by Letters Patent, is—

1. The combination in an electric battery, of the pockets $x$ with the battery-case; the said pockets being a part of the battery-casing; the cover A, connected with the battery-casing by a hinge B, the said cover provided with two spring-latches $m$, $m$, fixed on top of said cover at two points of equal distance from the hinge B, extending down the side of the battery-case at a right angle to the plane of said cover in contact with and clutching the screw $o$, the said latches and hinge B connected with the negative electrodes through the screw $o$.

2. The hard-rubber plugs $Z'$, and U-loops in combination with the positive electrodes in connection with switches; the said switches being connected with the negative electrodes through the screws $d$ by conducting-wires $d'$, the electrodes being suspended in an electrolyte completing an electric circuit through the wires $w$, $w$, to the lamp on the side of the battery-case, substantially as described.

ALBERT E. STEPHENSON.

Witnesses:
HENRY HERRING,
C. C. BISHOP.